Nov. 23, 1971  H. E. COLESTOCK  3,621,550
SHRINK FIT ASSEMBLY PROCESS
Filed June 15, 1970  2 Sheets-Sheet 1

INVENTOR.
HARRY E. COLESTOCK
BY Edward J. Norton
Attorney

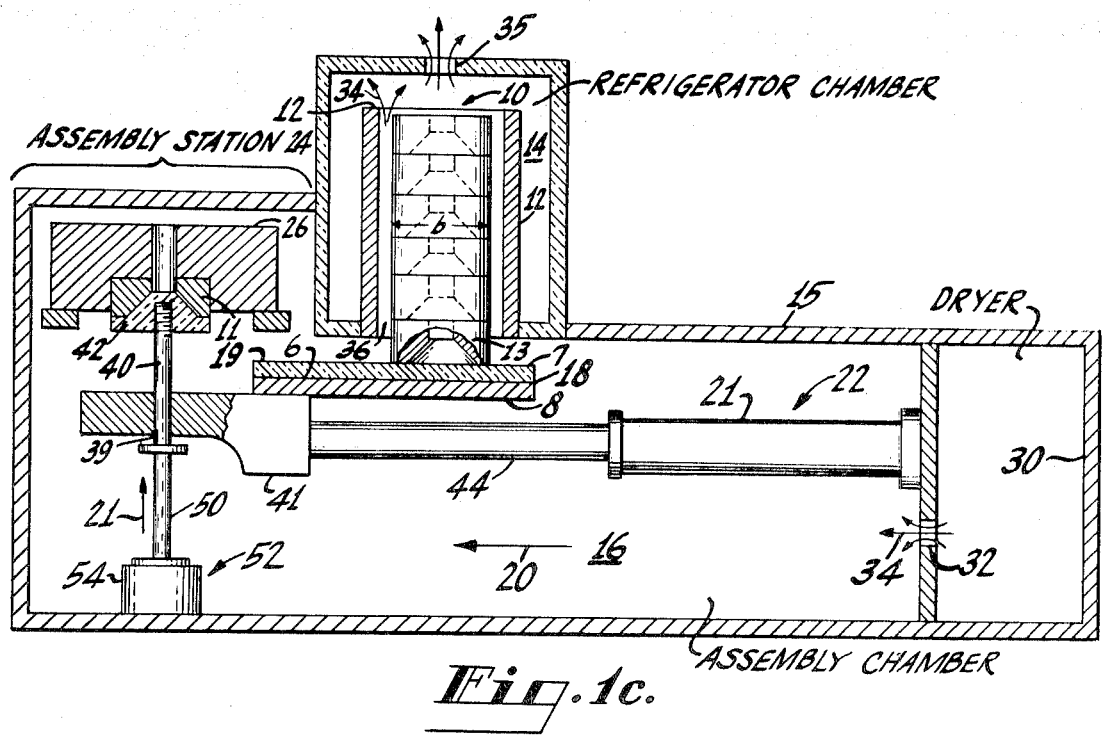

United States Patent Office 3,621,550
Patented Nov. 23, 1971

3,621,550
SHRINK FIT ASSEMBLY PROCESS
Harry Elliott Colestock, Ann Arbor, Mich., assignor to International Telephone and Telegraph Corporation
Filed June 15, 1970, Ser. No. 46,408
Int. Cl. B21k 1/20; B23p 11/02, 13/00
U.S. Cl. 29—156.7 A
9 Claims

ABSTRACT OF THE DISCLOSURE

A method for assembling two piece parts using the shrink fit technique includes providing cooling and assembly chambers for the piece parts, and drying the chambers to prevent formation of condensation and frost which might otherwise interfere with the assembly sequence.

BACKGROUND OF THE INVENTION

Figure 1A:
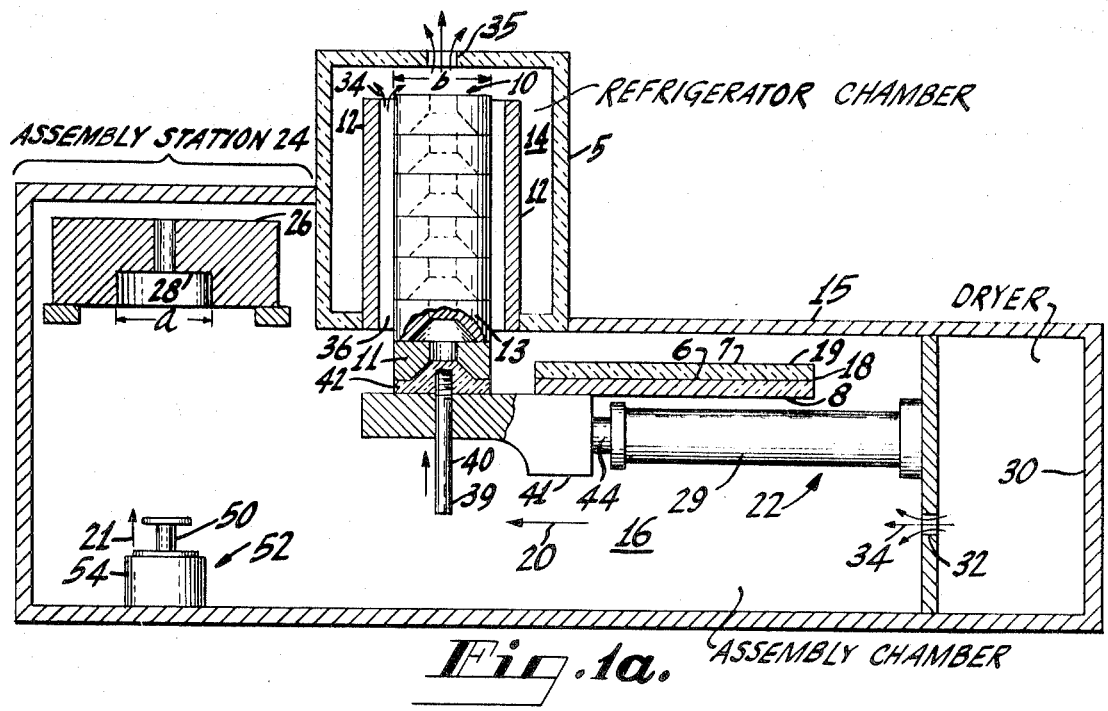

This invention relates to a process for assembling piece parts utilizing the shrink fit technique.

Present methods for assembling piece parts incorporating shink fit techniques include machining or otherwise forming the parts to be assembled such that the parts have corresponding dimensions which mate in the assembled condition, that is, one part or a portion thereof, is internally fitted within the other or a portion thereof at the corresponding assembly dimension. When both piece parts are at the same temperature, whether ambient or otherwise, the mating assembly dimensions are a size such that the assembly dimension of the piece part to be internally fitted is greater than the size of the corresponding assembly dimension of the external piece part into which the internal part is to be inserted.

To permit assembly, the larger, internal piece part is cooled to a temperature at which its assembly dimension is reduced to a size that is less than the size of the mating dimension of the external piece part, at which time the piece parts may be assembled. When the two assembled pieces reach an equilibrium temperature where they again are both at the same temperature, the internally assembled piece part expands and the expansion pressures exerted thereby on the external piece part assembled thereto cause large compression forces at the assembly dimensions of both piece parts, securing the piece parts together.

When the internally assembled piece part is cooled to a temperature sufficiently low to cause its corresponding assembly dimension to shrink to a size smaller than the mating dimension of the external piece part, the temperature to which the piece part is cooled is, in most cases, below 0° C. (32° F.). In some cases, such as in the assembly of piece parts to engines, extremely low temperatures are encountered, typically in the range of —120° F. to —150° F. But, in any case, condensation occurs, and when the cooled temperature is below the freezing temperature of the condensation, the condensation freezes and forms a frost. The frost may form on the piece parts themselves and on any components in thermal contact therewith.

Further, when components or members of automatic machinery having an ambient temperature are used to assemble these piece parts, the members are placed in thermal contact with the cooled piece parts, and any moisture on the components or members will freeze, causing the members and piece parts to stick together. When machine members are placed in continuous thermal contact with the cooled piece parts, the members reach the temperature of the cooled parts, and frost forming on the cooled members eventually immobilizes the mechanism. Due to these limitations, prior art processes utilizing the shrink fit technique are limited to manual handling of the cooled piece parts wherein an operator manually removes the cooled piece parts from a freezer chest for the subsequent assembling sequence.

Therefore it is an object of the present invention to provide a shrink fit process that lends itself to automatic handling.

It is a further object to provide an automatic shrink process in which interference from frost is substantially eliminated.

These and other summary of the invention objects are attained in the present invention in which a method is provided for assembling a first piece part to a second piece part. The method includes shrinking the first piece part by cooling it to a temperature below 0° C. (32° F.) in a first chamber, the second piece part being positioned at an assembly station within a second chamber. Both chambers are dried such that the dew point of the atmosphere therein corresponds to a temperature less than the first piece part temperature, thus avoiding the occurrence of condensation in either of the chambers. The first piece part is then positioned at the assembly station and assembled to the second piece part.

Figure 1B:
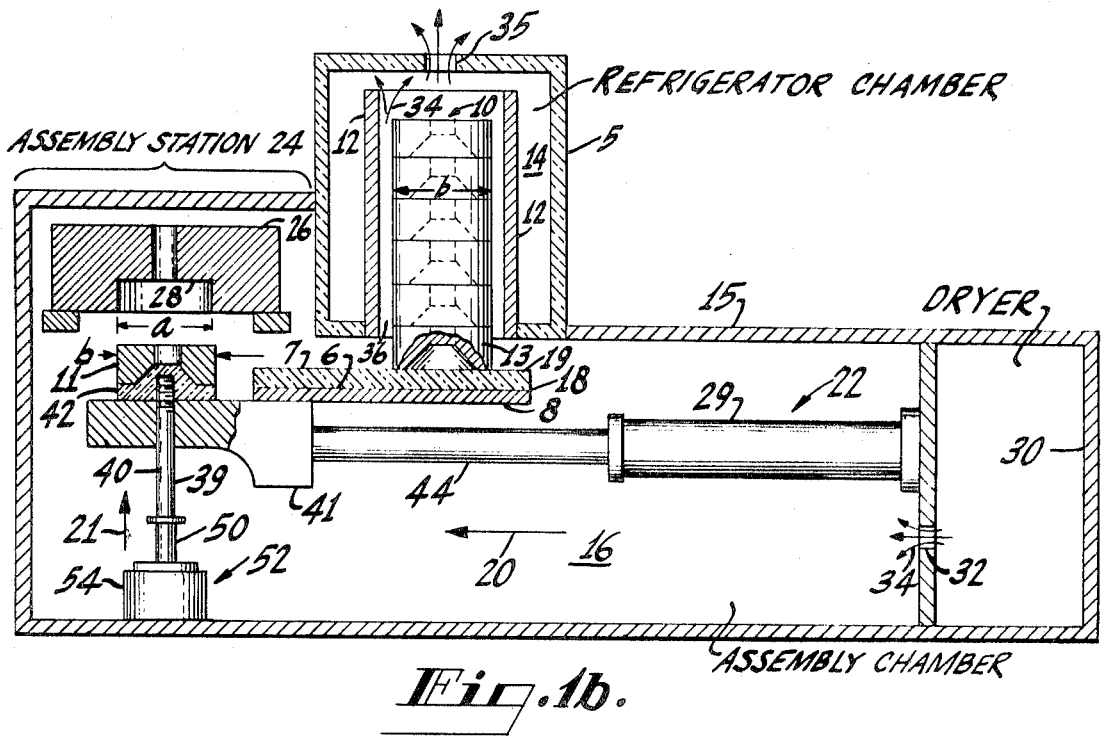

In the drawing:

FIGS. 1a–c are cross-sectional end views through one embodiment of an apparatus capable of shrink fit assembling two piece parts in accordance with the present invention, the apparatus being shown at various stages of the assembly process.

DETAILED DESCRIPTION

In the process of the present invention a first piece part, such as a valve seat, to be shrink fitted to a second piece part, such as an engine head, is cooled and stored in a refrigerating chamber. A second piece part, for example, an engine head, in the meantime, is positioned at an assembly station within a second chamber. The second piece part has a recess disposed therein into which the first piece part is assembled. The refrigerating chamber cools the first piece part down to a temperature in the range of —120 to —150° F. to reduce the assembly dimension thereof to a size less than the assembly dimension of the second piece part.

Means are disposed in the second chamber for automatically dispensing and transferring the first piece part from the refrigerating chamber to the assembly station in the second chamber. Those portions of these automatic means in thermal contact with the cooled piece parts are made of or coated with thermally insulating material to prevent rapid heat transfer from the dispensing and transferring means to the first piece part handled thereby. However, since the dispensing and transferring means may be automatic, and thus handle in any cooled piece parts in rapid succession, these mechanisms eventually are cooled to a temperature approximately equivalent to the temperature of the first piece parts. In this latter instance, condensation, if permitted to occur on these cooled mechanisms, would rapidly freeze and coat them with frost.

Further, any member of automatic machinery that is at ambient temperature and has even the slightest amount of moisture thereon would immediately be secured, as if welded, to any member or piece part having temperatures below freezing, the problem magnifying with increasingly lower temperatures.

To overcome this serious impediment to the adaptation of shrink fitting assembly techniques to automatic operations, the present invention removes any moisture within both the refrigerating chambers and the assembly chamber such that the dew point of these chambers is less than the temperature of the cooled first piece part. As long as the atmospheres of the chambers are maintained at this dew point temperature, moisture, if any, that is present in the chambers, will be removed to the point that condensation will not take place on any cooled member or piece part when within either of the chambers. As a result, there is no sticking, jamming or other interference of the various mechanisms utilized in the dispensing and transferring means arising from the reduced temperatures.

In FIGS. 1a–1c, there are illustrated the various assembly stages in which a first piece part such as a value seat is shrink fit assembled to a second piece part such as an engine head in accordance with the present invention. FIG. 1a, in particular, illustrates the initial assembly state of valve seats 10, stacked in a magazine 12 within a refrigerating chamber 14 provided by housing 5. The magazine 12 may be a conventional hollow tube or the like and is in communication with a second chamber 16 defined by housing 15 which houses a slider 18 and transfer drive mechanism 22 which dispenses valve seats 10 one at a time from magazine 12 in direction of arrow 20 to assembly station 24 in a manner to be described. Mechanism 22 includes a solenoid or hydraulic cylinder 29 and a transfer shaft 44. At station 24 within chamber 16, piece part 26, such as an engine head having a valve seat receiving recess 28 disposed therein, is positioned thereat. Engine head 26 may be transferred to assembly station 24 in a direction into or out of the drawing, preferably by conventional conveyor means.

In the meantime, conventional dryer 30 has been pumping dried air or other inert dried atmosphere into chamber 16 at outlet 32, chamber 16 having an ambient temperature. The flow rate of dried air 34 into chamber 16 from dryer 30 is dependent upon the rate of leakage of the atmosphere of chamber 16 therefrom. Regardless of the leakage rate, a positive pressure is maintained in chamber 16 such that substantially all of the original atmosphere therein is purged and substantially all moisture has been evaporated therefrom for maintaining the predetermined dew point, therein. Refrigerator chamber 14, being preferably in communication with chamber 16 by way of magazine 12 is also purged of its original atmosphere. Leakage port 35 provides communication between chamber 14 and the surrounding ambient atmosphere such that the positive pressure of dry air 34 in chamber 16 flows into chamber 14 and out to the ambient by way of port 35.

Alternatively, chamber 14 could be dried independently of chamber 16, and in this instance chamber 14 need not be in communication with chamber 16. Movable flaps or other means (not shown), which permit piece part 26 to enter and leave chamber 16 automatically along the conveyor means noted above while maintaining the integrity of the atmosphere of chamber 16, may also exhibit some atmospheric leakage. The positive pressure of dry air 34 in chamber 16 ensures that the dry air flows out of the chamber and no appreciable amount of moist air enters therein which air might tend to change the dew point thereof. By positive pressure it is meant that the atmospheric pressure within the chambers is greater than the atmospheric pressure in the surrounding ambient. Thus, if any leakage does occur, the leakage passes only in the direction from chambers 14 and 16 to the ambient.

The dry air 34 that is pumped into chambers 14 and 16 provides a dew point temperature that is less than the lowest temperature of piece parts 10 and refrigerator chamber 14, which in this instance is about −140° F. By maintaining this dew point in the chambers, condensation does not substantially manifest itself to the detriment of the process in any of the chambers, and any moisture that may have been present is substantially removed prior to commencing the assembly operation.

The atmosphere in chambers 14 and 16 having been dried to the desired relative humidity level, commencement of the assembly sequence of value seats 10 to the engine heads may begin. Prior to discussing the assembly sequence, the feed, transfer and assembly members of the automatic assembly equipment which are all contained within chambers 14 and 16, will now be described.

As previously indicated, piece parts 10 are stacked in dispensing magazine 12. At the dispensing end 36 of the magazine 12, the piece parts 10 are stacked on top of insertion piston 40 such that at least one piece part 11 of parts 10 is adjacent thereto and resting thereon at inserting anvil 42. Piece parts 10 may be fed by gravity or force fed to anvil 42. Anvil 42 is made of a tough, durable thermoplastic material such as nylon having a low coefficient of htermal conductivity to prevent rapid conduction of heat to piece parts 10 in thermal contact therewith, the shape thereof being such as to permit piece parts 10 to snugly, but fully seat thereon for subsequent transfer thereby. Anvil 42 is threaded or otherwise fastened to shaft 39 which is made of steel.

Anvil 42 serves as (i) a transfer vehicle for transferring each of piece parts 10, one at a time, to assembly station 24 and (ii) as a driving medium for forcing each of piece parts 10 into its corresponding recess 28 in the engine head 26 to which piece parts 10 are to be shrink fit assembled. Shaft 39 of piston 40 serves as a force transfer medium for the insertion forces applied by power inserting means 52 in a manner to be described, shaft 40 reciprocating within its complementary closely fitted hole in transfer drive member 41. Not shown are resilient spring members used to drive shaft 39. These spring members absorb any drive shock present should valve seats 10 fail to insert into recess 28. These spring members serve similar functions as those springs used in the art of die forming piece parts.

Member 41 is secured to transfer drive mechanism 22 by way of transfer shaft 44, which may be the piston of a solenoid or hydraulic drive cylinder 29. Mechanism 22 causes member 41 to reciprocate in the direction of arrow 20 in accordance with control means (not shown) such that piston 40 is positioned alternatively at assembly station 24 and at dispensing magazine 12.

Secured to member 41 is slider 18. Slider 18 includes a sheet of steel 8 or other rigid material having a width into the drawing sufficiently great to close the opening of magazine 12 at dispensing end 36 to prevent further dispensing of piece parts 10 such as piece part 13 next above piece part 11. Piece part 11 rests on anvil 42 when slider 18 is transferred in direction 20 toward assembly station 24. Slider 18 has a length sufficiently great in direction 20 such that when insertion piston 40 is transferred to assembly station 24, magazine 12 is closed thereby at dispensing end 36 as illustrated in FIG. 1b.

Fastened to sheet 8 is sheet 7 of approximately the same length and width as sheet 8 and made of material having a low coefficient of thermal conductivity and a low coefficient of friction. A preferred material is a thermoplastic material such as polytetrafluoroethylene. The thickness of sheet 7 is that thickness which will prevent rapid conductivity of heat therethrough when the temperature gradient between surface 19 thereof and the interface surface 6 thereof at sheet 8 is large; for example, a temperature gradient of about 210° F. (−140° F. to 70° F.) across a distance of approximately ⅜ inch corresponds to a thickness of approximately ⅜ inch of thermoplastic sheet 7 in an apparatus constructed in accordance with this embodiment. The low coefficient of thermal conductivity of sheet 7 and of anvil 42 precludes excessive heat transfer to piece parts 10 which are in thermal contact therewith. Thus, the integrity of the shrink fit assembly dimension $b$ of piece parts 10 as they come in thermal contact with anvil 42 and slider 18 is controlled by maintaining the temperature of piece parts 10 substantially at their cooled down temperature. This temperature is maintained by preventing deleterious heat transfer to parts 10 during the transfer and assembly cycles.

Although some heat transfer may take place between slider 18 and insertion anvil 42 with piece parts 10, the combination of low thermal conductivity and the speed of the assembly operation may be selected such that the desired temperature of piece parts 10, ergo the predetermined shrunken assembly dimension $b$, are not adversely affected by the heat transfer that may occur.

After continuous and repetitive exposure to piece parts 10 and chamber 14, however, slider 18 and anvil 42 may reach an equilibrium temperature approximately at the temperature of piece parts 10 and chamber 14. Thus any moisture if otherwise present in chamber 16 would condense and freeze therein. By reducing the dew point of chambers 14 and 16 to below the coolest anticipated temperature therein, condensation and the freezing thereof is precluded. In addition, the low coefficient of friction of slider sheet 7 eliminates the necessity for lubricants thereon which, if present, would freeze due to the low temperatures thereat, and cause jamming or otherwise interfere with the operation of the apparatus. Should minute quantities of moisture be present on slider 18 at surface 19 thereof, the low coefficient of friction of sheet 7 will contribute to preventing minor sticking which might otherwise occur.

At assembly station 24, engine head 26 is prepositioned in chamber 16 on a conveyor as indicated previously. Beneath head 26, in chamber 16, is power insertion means 52 which includes hydraulic cylinder 54 or the like and an insertion drive piston 50 which reciprocates in the direction of arrow 21 in accordance with control means (not shown). Piston 50 and recess 28 are positioned in alignment with each other in direction 21. Other means (not shown) serve to fine align recess 28 to piece parts 10 during the insertion step. Such other means could be an alignment hole in head 26 and a mating alignment pin driven by piston 50 in direction 21.

When the assembly sequence is started by control means (not shown), shaft 44 of FIG. 1a is propelled in direction of arrow 20 by solenoid or hydraulic cylinder 29. Shaft 44 causes insertion piston 40 and slider 18 to translate in direction 20 to assembly station 24 by way of transfer drive member 41. Anvil 42 may be so configured as to have guide means therein to accurately align and contain piece part 11 thereon such that the momentum of piece part 11 when shaft 44 commences to translate in direction 20 does not cause piece part 11 to be displaced therefrom, piece part 11 resting on anvil 42 during the transferring process. As slider 18 travels in direction 20, surface 19 thereof slides beneath piece part 13 next above piece part 11, the slider 18 serving as a shutoff valve for the remainder of piece parts 10 stacked in magazine 12. In this manner, insertion piston 40 and piece part 11 to be next assembled are transferred to an assembly position at the assembly station 24.

FIG. 1b illustrates the state of the assembly sequence when piece part 11 has been transferred to assembly station 24. In this position, insertion piston 40 has been transferred thereto by transfer shaft 44 such that piece part 11 is in alignment with recess 28 of valve seat receiving block or engine head 26. Control means (not shown), such as a limit switch, may control the course location of piston 40. In this position, insertion shaft 39 of piston 40 abuts or is adjacent to piston 50 which is translated in direction 21 by hydraulic cylinder or solenoid 54 and aligned to head 26 as indicated above. Means 54 could be any hydraulic cylinder or the like which is capable of force fitting piece part 11 into recess 28 by way of reciprocating piston 50.

Piece part 11, as mentioned previously, may be a valve seat which has an outer assembly diameter $b$ at the cooled temperature which is such a size that it will, under pressure, closely fit in recess 28, which has an inner assembly diameter $a$ slightly greater than the cooled valve seat outer diameter at the time of assembly. Power insertion means 52, piston 40, block 26 and mechanism 22 are all contained within chamber 16 during the entire process, which chamber remains at a substantially ambient temperature.

In FIG. 1c, piston 50 has been driven in direction 21 toward block 26 by hydraulic cylinder 52 forcing seat 11 into recess 28 of block 26, assembling at least a portion of seat 11 thereto at diameter $b$ thereof to demension $a$ of block 26. Anvil 42, being movably secured to member 41 by way of shaft 39, moves in direction 21 while also being capable of being returned to its original position illustrated in FIG. 1a by transfer drive shaft 44. After seat 11 is inserted into block 26, piston 50 and shaft 44 are respectively returned to the positions illustrated in FIG. 1a by control means (not shown). As seen in FIG. 1c, piece part 13 in magazine 12 rests adjacent slider 18 on surface 19 thereof. When slider 18 is returned to its original position, piece part 13 then falls by way of gravity or force feed into place similarly as that of seat 11 illustrated in FIG. 1a. The above process is then repeated.

All during the process described, chambers 14 and 16 have been maintained at a dew point less than the temperature of piece parts 10. Eventually, due to the continual thermal contact of anvil 42 and surface 19 with piece parts 10, these surfaces and the adjacent members reach an equilibrium temperature below 0° C. If the atmosphere of chambers 14 and 16 were not dried, then condensation on these members would freeze, interfering with the entire assembly operation, and causing it to jam and be inoperative.

I claim:

1. A method of assembling a first piece part having a temperature below 0° C. to a second piece part having an ambient temperature, comprising:

storing and shrinking said first piece part in a first chamber at said temperature below 0° C., positioning said second piece part within a second chamber having an ambient temperature, said second chamber being in communication with said first chamber, reducing the moisture content of said first and second chambers to a value corresponding to a dew point temperature less than said first piece part temperature, transferring said shrunk first piece part from said first chamber to said second chamber, and assembling said shrunk first piece part in said second piece part within said second chamber, whereby condensation and freezing of said condensation within said chambers is precluded, substantially eliminating interference with the assembly of said first piece part to said second piece part.

2. The method of claim 1 wherein said storing step includes stacking a plurality of said first piece parts in a magazine capable of dispensing said first piece parts one at a time.

3. The method of claim 1 wherein said transferring step includes substantially maintaining said first piece part at said temperature below 0° C. in said second chamber during said transferring step.

4. The method of claim 1 wherein said transferring step includes automatically disposing said first piece part at an assembly position in said second chamber, and automatically assembling at least a portion of said first piece part into said second piece part so that condensation and freezing of said condensation is prevented, substantially eliminating interference with said transferring step which would otherwise be caused by said frozen condensation.

5. The method of claim 1 further including the step of providing an atmospheric pressure within said first and second chambers greater than the ambient atmospheric pressure for preventing ambient atmosphere from entering said chambers whereby said moisture content in said chambers is maintained.

6. A method of automatically assembling a valve seat to a valve seat receiving block, said valve seat having an outer assembly diameter greater than the mating internal diameter of a seat receiving recess in said block when said seat and said block are at the same ambient temperature, said seat being cooled to a second temperature sufficiently low to cause said outer diameter to be smaller than said mating internal diameter for assembly thereto, said method comprising:
storing and shrinking a plurality of said valve seats in a refrigerating chamber at said second temperature, said seats being stacked in a magazine contained within said chamber,
automatically conveying said valve receiving block into a second chamber having an atmosphere at said ambient temperature, said second chamber being in communication with said refrigerating chamber and the ambient atmosphere,
automatically positioning said valve receiving block at an assembly station within said second chamber,
reducing the moisture content of said refrigerating and said second chambers to a value corresponding to a dew point temperature less than said second temperature,
providing an atmospheric pressure within said chambers greater than the ambient atmospheric pressure,
automatically dispensing a shrunk valve seat from said magazine,
automatically transferring said dispensed shrunk valve seat to said assembly station, and
automatically assembling at least a portion of said shrunk valve seat into said seat receiving recess such that condensation and freezing of said condensation is prevented, substantially eliminating interference with the automatic assembly of said valve seat which would otherwise be caused by said frozen condensation.

7. The method of claim 6 wherein said second temperature is in the range of about $-120°$ F. to $-150°$ F.

8. The method of claim 6 wherein said valve seat receiving block is an engine head.

9. A method of assembling a first piece part to a second piece part, comprising:
shrinking said first piece part by cooling said first piece part to a temperature below $32°$ F. in a first chamber,
positioning said second piece part at an assembly station within a second chamber, said second chamber being in communication with said first chamber, said second chamber having an ambient temperature,
reducing the moisture content of the atmosphere of said first and second chambers to a value corresponding to a dew point temperature less than said first piece part temperature,
transferring said shrunk first piece part from said first chamber to said assembly station without substantially altering the temperature of said first piece part, and
subsequently assembling said shrunk first piece part in said second piece part at said station, whereby condensation and freezing of said condensation within said chambers is precluded.

References Cited

UNITED STATES PATENTS

| 1,692,966 | 11/1928 | Treiber | 29—156.7 A |
| 1,955,728 | 4/1934 | Allen et al. | 29—447 UX |
| 1,987,677 | 1/1935 | Glassford | 29—447 UX |
| 2,218,722 | 10/1940 | Ross | 29—SHFT UX |

CHARLIE T. MOON, Primary Examiner

U.S. Cl. X.R.

29—447, 200